UNITED STATES PATENT OFFICE.

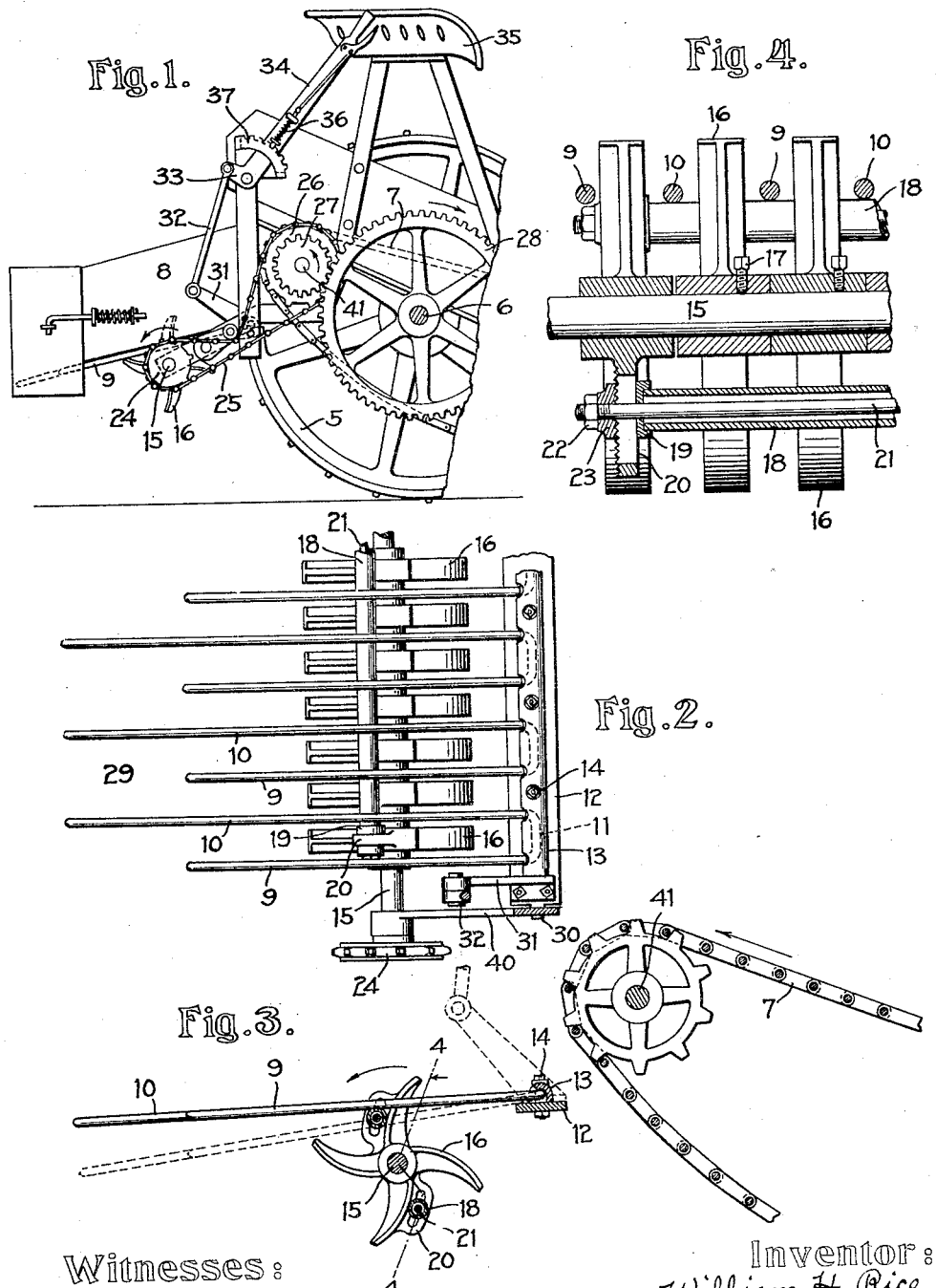
W. H. RICE, DEC'D.
J. E. RICE, ADMINISTRATOR.
BEATER MECHANISM.
APPLICATION FILED MAY 5, 1913.
1,109,302.
Patented Sept. 1, 1914.

WILLIAM H. RICE, OF ROCHESTER, NEW YORK; JOHN E. RICE, ADMINISTRATOR OF SAID WILLIAM H. RICE, DECEASED.

BEATER MECHANISM.

1,109,302.  Specification of Letters Patent.  Patented Sept. 1, 1914.

Original application filed February 23, 1909, Serial No. 479,632. Divided and this application filed May 5, 1913. Serial No. 765,713.

*To all whom it may concern:*

Be it known that I, WILLIAM H. RICE, a citizen of the United States, and resident of Rochester, in the county of Monroe and State of New York, have invented certain new and useful Improvements in Beater Mechanism, of which the following is a specification.

This invention relates to beater-mechanism adapted for use in connection with agricultural machines, particularly with machines for digging peanuts, potatoes and the like, the beater-mechanism being designed for the purpose of separating the adherent earth from the vines and tubers which have been dug, and for the further purpose of separating the larger tubers from the vines.

The invention relates particularly to beaters of the type in which the materials, to be acted upon, are supported upon a series of parallel rods or fingers, which are agitated to assist the separation of the materials, while the materials are impelled toward the free ends of the fingers by means of beater-arms rotating between the fingers.

One object of the invention is to improve the construction and operation of the means for agitating the beater-fingers, both by providing, in a simple and effective manner, for the adjustment of the amplitude of the movement of the fingers in accordance with the nature of the material to be operated upon, and by providing against the tendency of vines to wind around the means by which the beater-arms are actuated.

A second object of the invention is to adapt the beater to separate at least the larger tubers from the vines, in addition to freeing the vines and tubers from adherent earth; and a third object of the invention is to provide means by which the amplitude of movement of the beater-fingers may be readily changed at will during the operation of the machine, in accordance with variations in the nature of the ground over which the machine is working.

Other objects of the invention, and the various features of construction by which these several objects are attained, will be set forth in connection with the following description of the illustrated embodiment of the invention.

In the accompanying drawings:—Figure 1 is a side-elevation of beater-mechanism embodying the present invention, as applied to a machine for digging peanuts, potatoes and the like, certain other portions of the machine being shown to illustrate the manner in which the beater-mechanism may be mounted and actuated; Fig. 2 is a plan-view, on a larger scale, of a portion of the beater-mechanism including the beater-fingers and the beater-arms; Fig. 3 is a side-elevation of the parts shown in Fig. 2; and Fig. 4 is a section, on a still larger scale, taken on the line 4—4 in Fig. 3.

The invention, as illustrated, is embodied in a machine having the usual supporting-wheels 5, at least one of which constitutes also a traction-wheel for actuating the various mechanisms of the machine. These wheels are journaled on an axle 6, to which one at least of them is rotatively connected. In addition to means (not shown) for digging the vines and tubers, the machine is provided with an endless conveyer 7, which carries the material to the beater-mechanism and is adapted to discharge it upon the beater-fingers, owing to the relative positions of the fingers and the rear-end of the conveyer, as shown in Fig. 3.

The beater-mechanism is inclosed, for the most part, between side-walls 8, shown in Fig. 1, by which the material is confined upon the beater-fingers until it is finally discharged from the rear-ends of the fingers. These fingers comprise a series of parallel iron rods extending in a fore-and-aft direction, and slightly inclined toward their rear-ends. The fingers are arranged in pairs, each pair comprising fingers 9 and 10 which are made integrally of a single length of rod, as shown in Fig. 2. The rod is bent into U-shape, so as to provide, at its forward portion, a transverse connecting-member 11 which serves as a journal for the fingers. The parts 11 are supported on a transverse bearing-bar 12, and are retained thereon by means of a channel-shaped bar 13 fixed to the bearing-bar by means of bolts 14. The channel-bar is notched, as shown in Figs. 2 and 3, to permit pivotal movement of the fingers for the purpose hereinafter described. Beneath the fingers a transverse shaft 15 is journaled, on bars 40 constituting parts of the fixed frame-work of the machine, and this shaft supports and actuates the beater-arms 16. These arms are arranged in sets of four, cast integrally, each set of arms being arranged to rotate between two adjacent beater-fingers. Each set of arms has a hub fixed upon the shaft 15 by means of a set-screw 17, as shown in Fig. 4, with the exception of the two outermost sets, which are loose upon the shaft for a reason which will be presently described.

The beater-arms, in addition to performing the usual function of devices of this character, namely, agitating the material upon the fingers and propelling it toward the rear-ends of the fingers, constitute also a portion of the means by which the fingers are agitated. To this end two transverse tubular rods 18 are employed. These rods are seated, at their ends, in caps 19 (Fig. 4) which engage slotted lugs 20 on two opposite arms at the ends of the series of arms. The rods 18 are fixed in place by means of through-bolts 21, which pass through the rods and the caps and through slots in the lugs 20, being provided, at their ends, with nuts 22 engaging washers 23. These washers are toothed on their inner surfaces, and engage corresponding teeth on the lugs 20, as shown in Fig. 4, thus normally securing the parts against accidental movement, and fixing the radial distance of the rods from the shaft 15.

In certain positions of the shaft 15 and the beater-arms the beater-fingers rest upon the hubs of the arms, as shown in dotted lines in Fig. 3. As the shaft rotates, however, the intermediate beater-arms press against the tubular rods 18, thus causing these rods and the outermost beater-arms to rotate with the shaft and the intermediate arms. Accordingly, the rods are brought intermittently into engagement with the fingers from beneath, thus alternately raising and dropping the fingers, and agitating them to promote the separation of the materials supported on the fingers.

The adjustable connections, between the rods 18 and the arms which support them, are provided for the purpose of adjusting the amplitude of movement of the beater-fingers. When the machine is operating upon loose and sandy ground a slight movement of the fingers is sufficient to cause the separation of the adherent earth from the vines and tubers, and in this case the rods 18 are adjusted nearer to the shaft 15, so as to lift the fingers through shorter distances. On the other hand, a greater amplitude of movement is required in the fingers when acting upon earth of a loamy or tenacious character, and in this case the rods 18 are adjusted outwardly so as to move the fingers through a greater arc. The adjustments in question are performed by loosening the nuts 22 on the through-bolts, disengaging the washers 23 from the toothed surfaces of the lugs 20, and then sliding the rods and the through-bolts through the slots in the lugs 20 to the required position, the nuts being then tightened again to fix the parts in position. The beater-arms which support the rods 18 are mounted loosely on the shaft 15, as above described, to permit such lateral movement of the arms as is necessary to permit the nuts 22 to draw the parts all closely together by transverse movement of the arms in question.

It has heretofore been proposed to provide a beater with fingers and with beater-arms working between the fingers, and to agitate the fingers by the rotation of the shaft upon which the arms are mounted. In such previous constructions, however, so far as the applicant is informed, the means for agitating the fingers have been in the form of cam-like surfaces formed or directly mounted upon the shaft, so that the fingers are never out of contact with the shaft, or with the cam-surfaces thereon. It has been found, however, that such a construction is unsatisfactory in operation, owing to the fact that the vines tend to wind upon the shafts and the cams, so as to clog the apparatus and interfere with its operation. The present construction guards against this result, however, since the rods 18 act repeatedly to swing the fingers away from the shaft, and from the parts immediately mounted thereon, so that any vines which commence to wind upon the shaft are immediately pulled away and freed from the shaft.

The shaft 15 may be actuated in any convenient manner, but in the drawings it is illustrated as provided, at one end, with a sprocket-wheel 24. This wheel is connected, by a sprocket-chain 25, with a sprocket-wheel 26 journaled, for convenience, on the shaft 41 which supports the rear-end of the conveyer 7. Fixed to the sprocket-wheel 26 is a gear 27, which meshes with a gear 28 fixed on the axle 6. Accordingly, as the machine is drawn forwardly the rotation of the axle acts, through the gearing just described, to rotate the shaft 15 constantly in the direction indicated by arrows in Figs. 1 and 3.

As shown particularly in Fig. 2, the beater-fingers are of different lengths, each of the fingers 9 being shorter than the adjacent intermediate fingers 10. In this manner a series of spaces 29 are provided between the longer fingers 10, and beyond the rear-ends of the fingers 9. This arrangement promotes the separation of the materials, and particularly the separation of the larger tubers from the vines, since the spaces 29 permit the tubers to fall between the fingers, while the vines are still supported and agitated by the fingers 10, and as the movement of the fingers is greatest at their rear-ends the vines are violently agitated at this point, so as to pull them away from the heavier tubers. The vines are finally discharged, in the usual manner, from the rear-ends of the fingers 10, and fall upon the ground, whence they may be gathered by means of a rake carried by the machine, or in any other convenient manner.

While the radial adjustment of the tubular rods 18 provides, as above described, for the operation of the machine under various conditions, it may sometimes be necessary to use the machine over an area in which the character of the earth varies from point to point, so that constant or frequent readjustment of the operation of the fingers is desirable. To provide for this I employ manually-operable means by which the amplitude of movement of the fingers may be regulated during the continued operation of the machine. Accordingly, the bearing-bar 12 is provided, at its ends, with trunnions 30 by which it is pivoted in the frame-members 40, and at one end of the bearing-bar an arm 31 is fixed. This arm is connected, by a link 32, with a short arm 33 projecting from a hand-lever 34. This hand-lever is pivoted on the frame of the machine in a position where it is conveniently accessible from the driver's seat 35 of the machine, and a latch 36 and sector 37 of ordinary form are provided for retaining the lever in adjusted position. As shown in Fig. 3, the rear-edge of the bearing-bar 12 is adapted to act as a stop to limit the downward movement of the beater-fingers. Accordingly, by swinging the hand-lever and rocking the bearing-bar on its trunnions the bearing-bar may be adjusted to a position in which it will limit the downward movement of the fingers at any required point within their extreme range of movement. When the hand-lever is swung forwardly the bearing-bar is swung in a clockwise direction, so as to shorten the amplitude of the pivotal movements of the fingers, while these movements may be lengthened by swinging the hand-lever rearwardly. By this arrangement the operator of the machine is enabled to vary the amplitude of movement of the beater-fingers at any moment, in accordance with variations in the character of the ground over which the machine is passing, thus providing for the most effective operation of the machine at all times. This construction further provides for throwing the beater-fingers entirely out of operation, in so far as their agitating-movement is concerned, by throwing the hand-lever to its extreme forward position, and in this manner the movement of the fingers may be discontinued when the machine is being drawn idly over the ground from place to place.

This application is a division from my application filed February 23, 1909, Serial No. 479,632.

My invention is not limited to the embodiment thereof hereinbefore described and illustrated in the accompanying drawings, but may be embodied in various other forms within the nature of the invention as it is defined in the following claims.

I claim:—

1. Beater-mechanism having, in combination, a series of fingers arranged side-by-side and adapted to receive material upon their forward portions, and means for vibrating the fingers upwardly; some of the fingers, at their rearward ends, extending beyond the others so as to provide intermediate spaces through which tubers may fall while the vines are supported by the longer fingers and separated from the tubers.

2. Beater-mechanism having, in combination, a series of fingers arranged side-by-side and pivotally mounted adjacent their forward ends, upon which they are adapted to receive material; means for oscillating the fingers upwardly and simultaneously, and means for propelling the material toward the rearward ends of the fingers; alternate fingers extending beyond the intermediate fingers, at their rearward ends, so as to provide spaces through which tubers may fall while the vines are supported by the longer fingers and thus separated from the tubers.

3. Beater-mechanism having, in combination, a series of fingers adapted to support vines while separating them from adherent material, means for vibrating the fingers upwardly to promote the separation, and means, manually operable during the operation of the beater, to vary the amplitude of the vibrations according with variations in the character of the material.

4. Beater-mechanism having, in combination, a series of fingers lying side-by-side and adapted to support vines while separating them from adherent material; and means for vibrating the fingers upwardly and simultaneously, said means comprising a shaft extending transversely beneath the fingers, a rod fixed to and parallel with the shaft, and means for rotating the shaft to impart an eccentric movement to the rod and cause it to alternately engage and disengage the fingers.

5. Beater-mechanism having, in combination, a series of fingers lying side-by-side and adapted to support vines while separating them from adherent material, and means for vibrating the fingers upwardly and simultaneously; said means comprising a rod extending transversely beneath the fingers, and means for revolving the rod about an axis parallel with the rod, the rod being adjustable toward and from its axis of revolution to vary the amplitude of its operative movement.

6. Beater-mechanism having, in combination, a series of fingers lying side-by-side and adapted to support vines while separating them from adherent material, and means for vibrating the fingers upwardly; said means comprising a shaft extending transversely beneath the fingers, a rod parallel with the shaft and adapted to engage the fingers from beneath, means for rotating the shaft, and connections, between the shaft and the rod, adjustable to vary the distance of the rod from the shaft and the amplitude of the revolutions of the rod.

7. Beater-mechanism having, in combination, a series of fingers lying side-by-side and adapted to support vines while separating them from adherent material, a shaft extending transversely beneath the fingers, a series of beater-arms mounted on and rotated by said shaft, said arms moving between the beater-fingers, and a rod mounted upon said arms and substantially parallel with said shaft, the rod being revolved about the shaft by the arms, whereby it is caused to engage the fingers from beneath and vibrate them upwardly.

8. Beater-mechanism having, in combination, a series of fingers lying side-by-side and adapted to support vines while separating them from adherent material, a shaft extending transversely beneath the fingers, a series of beater-arms mounted on and rotated by said shaft, said arms moving between the beater-fingers, and a rod mounted upon said arms substantially parallel with said shaft, the rod being revolved about the shaft by the arms, whereby it is caused to engage the fingers from beneath and vibrate them upwardly, and the rod having connections with the arms adapted to permit adjustment of the rod toward and from the shaft to vary the amplitude of its movement.

9. Beater-mechanism having, in combination, a series of fingers lying side-by-side and pivotally mounted at their ends, actuating-means adapted to engage the fingers from beneath and vibrate them upwardly through predetermined paths of movement, and means for limiting the downward movement of the fingers about their pivotal points, said means being manually adjustable to vary the point at which the movement of the fingers is arrested and thus vary the amplitude of their vibratory movement.

10. Beater-mechanism having, in combination with a series of fingers lying side-by-side and free to vibrate upwardly at one end, means for so vibrating the fingers, said means comprising a rotary member located beneath the fingers and having an eccentric part adapted to engage the fingers from beneath and adjustable toward and from the axis of rotation to vary the amplitude of the vibratory movement.

WILLIAM H. RICE.

Witnesses:
FARNUM F. DORSEY,
D. GURNEE.

---

Copies of this patent may be obtained for five cents each, by addressing the "Commissioner of Patents, Washington, D. C."